United States Patent [19]

Borowski et al.

[11] 4,284,339
[45] Aug. 18, 1981

[54] PROGRAMMABLE FULLY AUTOMATIC SHUTTER SYSTEM FOR PHOTOGRAPHIC CAMERAS

[75] Inventors: Kurt Borowski, Aschheim; Josef Ganser, Münich, both of Fed. Rep. of Germany

[73] Assignee: AGFA-Gevaert Aktiengesellschaft, Leverkusen, Fed. Rep. of Germany

[21] Appl. No.: 965,920

[22] Filed: Dec. 4, 1978

[30] Foreign Application Priority Data

Dec. 5, 1977 [DE] Fed. Rep. of Germany ....... 2754122

[51] Int. Cl.³ .......................... G03B 7/00; G03B 9/06
[52] U.S. Cl. ........................................ 354/38; 354/43; 354/59; 354/271; 354/274
[58] Field of Search ....................... 354/26, 29, 36, 38, 354/226, 230, 231, 252, 256, 258, 30, 43, 44, 42, 49, 59, 60 L, 271, 274

[56] References Cited

U.S. PATENT DOCUMENTS

| 3,757,655 | 9/1973 | Kobayashi | 354/29 |
| 3,820,131 | 6/1974 | Tanaka | 354/38 |
| 3,848,985 | 11/1974 | Bennett | 354/42 X |

FOREIGN PATENT DOCUMENTS

| 1258258 | 1/1968 | Fed. Rep. of Germany . | |
| 1278822 | 9/1968 | Fed. Rep. of Germany | 354/258 |
| 2346713 | 3/1974 | Fed. Rep. of Germany | 354/258 |
| 2257608 | 5/1974 | Fed. Rep. of Germany | 354/258 |
| 1407255 | 9/1975 | United Kingdom | 354/258 |

*Primary Examiner*—L. T. Hix
*Assistant Examiner*—William B. Perkey
*Attorney, Agent, or Firm*—Michael J. Striker

[57] ABSTRACT

Upon exposure initiation, a shutter opens abruptly, an exposure-light diaphragm begins to open progressively, and a control diaphragm, behind whose aperture the light sensor is located, also begins to open progressively. The signal from the light sensor is integrated, and when the requisite total-light amount is reached the shutter falls closed abruptly. Accordingly, the system decides, on its own, what the exposure duration and exposure-light aperture size upon exposure termination will be. The user, however, can modify this fully automatic selection in the sense of longer exposures and smaller aperture, or else shorter exposures and larger aperture, by varying the motion-retarding force supplied by an electromagnetic motion retarder, which controls the speed at which the exposure-light aperture opens up. Prior to exposure initiation, the control aperture is at a minimum, but non-zero size, permitting scene-light-sufficiency measurement. The motion-retarding force is automatically lowered in response to temperature decreases and automatically boosted in response to scene-light increases, to counteract low-temperature slowness of mechanical movements and to prevent the need for unrealizably brief exposure durations. The electromagnetic motion-retarder is not connected to a current source, but instead generates magnetic motion-retarding force in response to movement of inductance-modifying structure in accordance with Lenz' law. When the user wishes to predispose the fully automatic system towards longer or shorter exposure durations or larger or smaller aperture sizes, the light-sufficiency indicator is automatically adjusted to take this into account.

8 Claims, 4 Drawing Figures

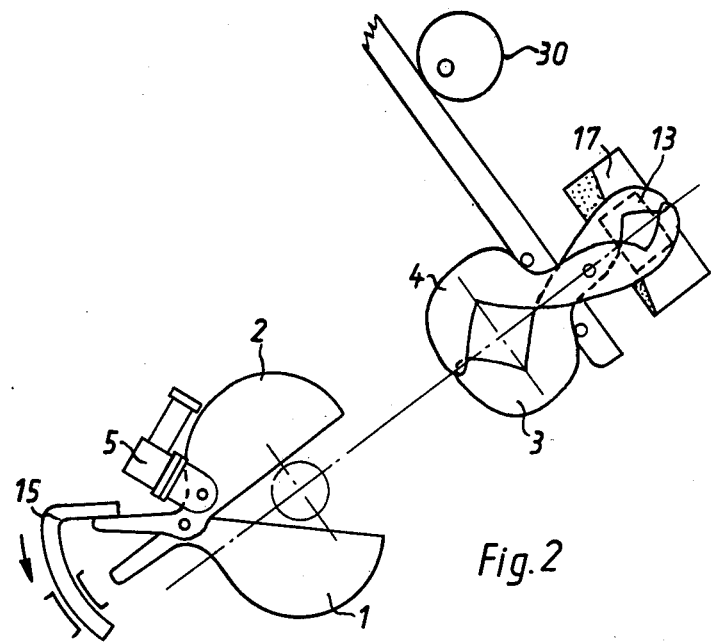
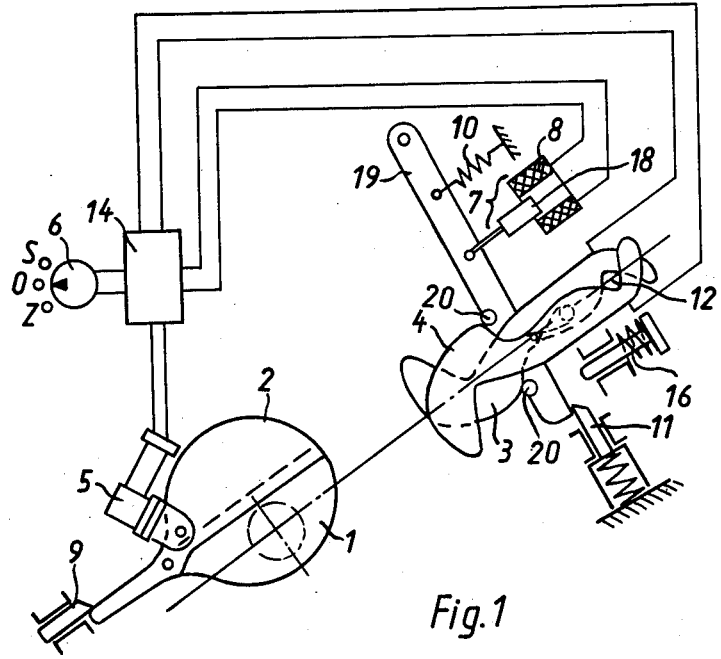

PROGRAMMABLE FULLY AUTOMATIC SHUTTER SYSTEM FOR PHOTOGRAPHIC CAMERAS

BACKGROUND OF THE INVENTION

The present invention concerns programmable, fully automatic shutter systems for photographic cameras, of the type in which the user is provided with at least some preselectability of exposure-aperture size or exposure duration, and cooperating with an electronic exposureduration control system of the type which activates, e.g., deenergizes, a holding electromagnet to permit the shutter to close at the moment when the totalized or integrated amount of light incident upon the camera's light sensor has reached a predetermined value. Also, shutter systems of the type in question are typically provided with means automatically operative for indicating to the user whether the prevailing scene-light level, i.e., taken in conjunction with further exposure parameters such as film sensitivity and the preselected shutter speed or aperture size, does or does not permit hand-held shooting or whether instead a tripod or flash illumination would be required.

The preferred embodiment of the invention, as explained much more fully below, makes use of an electromagnetic braking or retarding mechanism in conjunction with a shutter and a double diaphragm, one of the apertures of the double diaphragm being located in line with the shutter in the path of exposure light and the other aperture of the double diaphragm being located to control the incidence of light on the camera's light sensor. This basic approach results in a very considerable number of system flexibilities, which will be explained further below. However, inasmuch as electromagnetic braking or motion-retarding is involved, a brief discussion of the relevant prior-art aspects of such technique is in order.

In photographic cameras, braking or motion-retarding mechanisms are known, in a considerable variety of forms, for the purpose of controlling the speed of shutter movement and thereby exposure duration. For such purposes, it is also known in the prior art to make use of electromagnetic braking or motion-retarding systems. In general, these are so designed that the motion-retarding action is automatically controlled in dependence upon the light incident upon the camera's light sensor; e.g., the motion-retarding electromagnet, a current source, a photoresistor, and a control switch are connected in series, and variations in the level of light incident on the photoresistor result in corresponding variations of the motion-retarding action afforded by the electromagnet. The control switch is closed when the user depresses the camera release button, or other such user-activated member. Such a system is disclosed, by way of example, in published Federal Republic of Germany allowed patent application DT-AS No. 1,258,258.

Such shutter systems, i.e., wherein the control of shutter operation includes the use of an electromagnetic braking or motion-retarding force, can be designed in various ways from various viewpoints, for example depending upon the number of blades with which the shutter is provided, and depending upon what special functions or particular modifications of shutter performance the electromagnetic motion-retarding force is to be called upon to provide.

It is also known to use such electromagnetic motion-retarding systems, and to vary the intensity of their electromagnetic fields, for the purpose of controlling the distance through which the structure defining the exposure aperture moves, i.e., in order to determine or control exposure-aperture size. However, these known systems can only be used for pure and simple diaphragm-aperture regulation of the type which does not exhibit real functional dependence upon, or in particular complicated functional dependence, upon one or more further exposure parameters.

In view of such recognized flexibility limitations of shutter systems relying on magnetic-force motion retardation, attempts have been made to develop special-purpose motion-retarding and control systems specifically adapted for controlling the motions of mechanical components in photographic cameras, in which a permanent magnet connected to a moving component cooperates with one or more further, magnetically interconnected permanent magnets located along a motion-retarding path in such a manner that the particular motion-retarding function, e.g., the motion-retarding force as a function of displacement, or the like, is determined by the dimensions and configuration of a flux-return yoke cooperating with such permanent magnets; or else, the permanent magnet is provided with one or more specially configured shaped portions of cut-outs in its magnetic material whose configuration is then relied on to establish the particular motion-retarding function desired by the designer. However, even with that prior-art technique, the manner in which the motion-retarding function is generated, and the resulting exposure durations corresponding to such function, cannot be realized if the system is additionally to afford user-selectability of exposure duration and/or exposure-aperture size.

SUMMARY OF THE INVENTION

It is a general object of the invention to provide a programmable fully automatic shutter system for still cameras, i.e., preferably wherein the camera itself selects a combination of aperture size and exposure duration and wherein the sequence of aperture-size and exposure-duration value combinations automatically selected for progressively changing exposure conditions, and also further operating conditions, may be fairly complex, but wherein the user retains the ability to intervene and select, at least in some sense, what the shutter speed and/or aperture size will be despite automatic operation, and wherein this is furthermore achieved by programmed variation of the motion-retarding action afforded by an electromagnetic motion-retarding mechanism, so that fully automatic operation can be retained for both daylight and flash exposures, with the system furthermore being compatible for use with an indicating system which indicates to the user unequivocally whether the prevailing light conditions, and other exposure parameters taken into account, permit hand-held shots or require the need for a tripod or a flash.

However, within the context of what has just been said, it is equally a main object of the invention to provide a total system whose basic design and mode of operation is extremely flexible, e.g., allowing the designer of a particular system of the inventive type the greatest freedom in selecting which and how many exposure parameters are to be capable of being taken into account, and how many and how complicated the functional interdependencies among such exposure parameters can be, while still being, overall, of remarkably simple construction and operation. Likewise, the system is to be capable of use in a variety of operating modes, e.g., flash versus daylight conditions, where the user is to be given the auxiliary capability of choosing aperture size per se, and so forth.

As already stated, the extreme degree of simplicity and flexibility achieved by the present invention is based on the use of a system which involves the use of an electromagnetic motion-retarding system to make available a plurality of difference exposure durations combined with a double diaphragm one of whose apertures transmits incoming exposure light and the other of whose apertures controls the incidence of light on the camera's light sensor.

The novel featues which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 depicts an exemplary embodiment of the inventive shutter system, prior to performance of an exposure;

FIG. 2 depicts the system of FIG. 1 during the course of an exposure;

DESCRIPTION OF THE PREFERRED EMBODIMENTS

Figure 4:
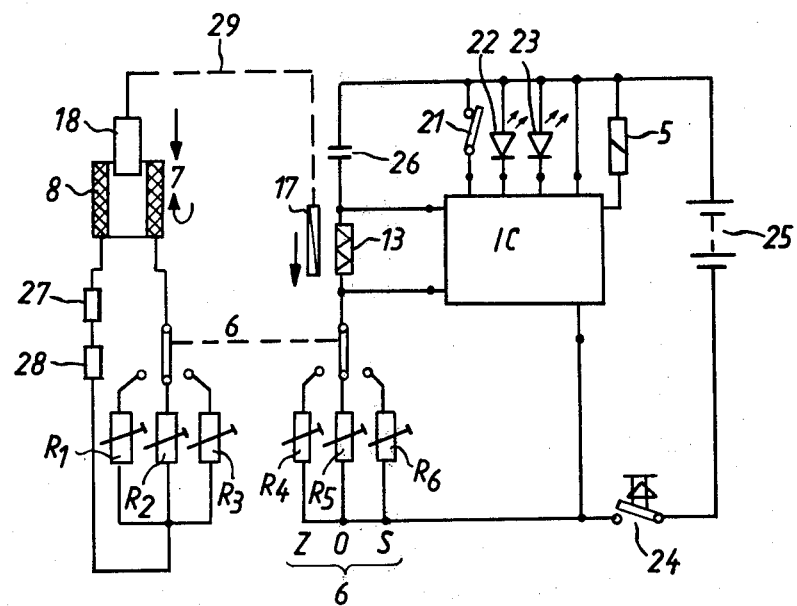
FIG. 4 depicts schematically the circuitry employed in the illustrated shutter system.

FIG. 1 is a somewhat schematic view of an exemplary embodiment of the inventive shutter system, prior to the initiation of an exposure. The exemplary shutter system illustrated includes a two-blade shutter structure 1, 2, comprising an aperture-unblocking blade 1 and an aperture-reblocking blade 2, and furthermore a two-blade diaphragm 3, 4. The operation of both the shutter 1, 2 and the diaphragm 3, 4 are electromagnetically controlled in this embodiment. In particular, a holding electromagnet 5 becomes energized prior to exposure initiation and holds the aperture-reblocking blade 2 in its aperture-unblocking position, and to terminate the exposure becomes deenergized so that aperture-reblocking blade 2 can move into the path of exposure light. The operation of the diaphragm 3, 4 is controlled by an electromagnetic motion-retarding system denoted in toto by numeral 7 and adjustable by the user with respect to motion-retarding action by means of a selector switch 6.

The two-blade diaphragm 3, 4 is urged by (nonillustrated) biasing springs from the aperture-closed setting shown in FIG. 1 towards the aperture-open setting shown in FIG. 2. The displacement of diaphragm 3, 4 from the FIG. 1 towards the FIG. 2 setting thereof is controlled by a lever 19 pivoted at its upper end. Lever 19 is provided with two camming pins 20 which track the curved cam surfaces of the two diaphragm blades 3, 4, the shapes of these cam surfaces at the outer edges of blades 3, 4, as well as the shapes of the inner or aperture-defining edges of diaphragm blades 3, 4 determining what the size of the diaphragm aperture will be for each successive angular position of the control lever 19. Control lever 10 is urged counterclockwise by a tension spring 10, but prior to exposure initiation is retained in the FIG. 1 setting by means of a latch 11, which latter moves to unlatching position when the user depresses the camera release button to initiate an exposure; depression of the release button additionally unlatches a latch 9 retaining the aperture-unblocking shutter blade 1 in its FIG. 1 setting, so that blade 1 can very abruptly swing to its FIG. 2 or aperture-unblocking setting.

Subsequent to termination of an exposure, when the illustrated shutter system is to be returned to its FIG. 1 condition, a pusher 16, either manually operated or coupled for example to the camera's film-transport lever or film-transport mechanism, displaces control lever 10 clockwise from its FIG. 2 setting back to its FIG. 1 setting. Likewise, a return member 15 (FIG. 2), which again can be coupled to the film-transport lever or anther part of the film-transport mechanism, returns aperture-unblocking blade 1 from its FIG. 2 position to its FIG. 1 position. Aperture-reblocking blade 2 is returned to its aperture-unblocking or ready position, preliminary to the next exposure, by reenergization of electromagnet 5 and/or by another mechanism coupled, e.g., to the film-transport mechanism of the camera.

Mechanically coupled to control lever 19 is a permanent-magnet plunger 8 which, when lever 19 is pulled counterclockwise by spring 10, plunges deeper and deeper into an electromagnet coil 18. The speed with which, upon release-button depression, diaphragm 3, 4 opens up is determined by the electromagnetic motion-retarding force exerted by motion-retarding mechanism 7.

The diaphragm system employed in the present invention is a double diaphragm. In the illustrated embodiment, the second diaphragm, defining a second diaphragm aperture 12 (FIG. 1) is, like two-blade diaphragm 3, 4, of the two-blade type, and indeed its two blades are in the illustrated embodiment merely extensions of the two diaphragm blades 3, 4. When the camera release button is depressed and diaphragm 3, 4 progressively opens, second aperture 12 likewise progressively opens up. Whereas the aperture of diaphragm 3, 4 is located, like shutter 1, 2, in the path of incoming exposure light, second diaphragm aperture 12 is, in the illustrated embodiment, not located in the path of incoming exposure light. The camera's light sensor 13 (see FIG. 2) is located behind the second diaphragm aperture 12, and it will be clear that as aperture 12 opens up during the course of an exposure this varies the amount of light incident upon light sensor 13. Also, it is to be noted that, prior to exposure initiation, first diaphragm 3, 4 is simply closed, whereas second diaphragm aperture 12 has a non-zero size, so that light can be incident upon the light sensor 13 prior to exposure initiation, for light-sufficiency measurement. After exposure intiation, the light incident upon light sensor 13 is integrated to generate a total-light signal, by circuitry shown in FIG. 4 and described further below, and when the total-light signal reaches a certain value holding magnet 5 is deenergized to terminate the exposure.

A shiftably or rotatably mounted filter 17 (FIG. 2) of progressively changing transmissivity is advantageously located in front of light sensor 13, for setting the system to take into account the sensitivity of the particular film being employed.

Figure 3:
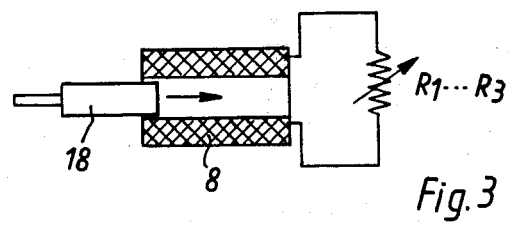
FIG. 3 depicts the electromagnetic motion-retarding system employed in the embodiment illustrated.

The speed at which exposure-aperture diaphragm 3, 4 progressively opens upon exposure initiation is determined by the motion-retarding action of braking mechanism 7. The motion-retarding system is shown per se in FIG. 3. As diaphragm 3, 4 progressively opens up, of course at relatively high speed, permanent magnet 18 plunges deeper and deeper into electromagnet coil 8. The two terminals of the constituent conductor of coil 8 are joined by a resistor R1 . . . R3. Accordingly, as magnet 18 plungers into coil 8, a voltage is induced across the terminals of the coil, and because the coil is closed off by resistor R1 . . . R3, a current is generated within the coil. This current causes the coil 8 to produce a magnetic field which, in accordance with Lenz' law, opposes further penetration of magnet 18 into coil 8, and thereby affords a motion-retarding force. The magnitude of the motion-retarding force can be varied, from the standpoint of the user, by adjustment of resistor R1 . . . R3. Additionally, the dimensions and configuration of plunger magnet 18 can be selected by the designer to implement various motion-retarding-force versus displacement (i.e., versus aperture-size) functional relationships, i.e., to give the designer further flexibility in designing the progressive opening scheme followed by exposure diaphragm 3, 4, e.g., in addition to what the designer can do by design of the outer or camming edges of the two diaphragm blades 3, 4.

Referring to FIG. 1, it will be noted that a control circuit 14 has a first output connected to holding magnet 5, a second output connected to motion-retarding coil 8, an input connected to the light sensor 13 behind aperture 12, and a further input connected to a useroperated selector switch 6. As shown in FIG. 4, selector switch 6 serves, in this embodiment, to switch into circuit with motion-retarding coil 8 a selected one of three different load resistors R1, R2, R3, for user selection of the motion-retarding force to be employed.

In FIG. 4, when a power-connect switch 24 is closed by the user, the illustrated circuitry becomes connected to a camera battery 25. It will be noted that the electromagnetic motion-retarding system need not be energized by the camera battery in the illustrated embodiment, and this is preferred, although a positively energized electromagnetic motion-retarding system would likewise fall within the scope of the invention. Prior to exposure initiation, scene light is incident through aperture 12 (FIG. 1) onto light detector 13 (FIG. 2). The light-indicating signal developed across light detector 13 is applied to the input of an integrated-circuit module IC which, in per se conventional manner, serves first to indicate scene-light sufficiency and thereafter to control exposure duration. In particular, prior to exposure, a mode-control switch 21 is closed, causing control circuit IC to operate in its scene-light sufficiency indicating mode, e.g., internally short-circuiting an externally connected light-integrating capacitor 26. A conventional threshold circuit internal to module IC ascertains whether the light-indicating signal developed by light detector 13 is or is not above a certain level, and in dependence thereon causes one or the other of two light-emitting diodes 22, 23 to become illuminated. These diodes are visible in the camera viewfinder and may, for example, be located behind respective red and green transparent plates, to give the user a red versus green indication of whether scene light is insufficient for a hand-held exposure (red) so that a tripod or flash unit would be needed or that the scene light is sufficient for hand-held operation (green).

After the user has been informed that the scene light is sufficient for hand-held operation, he depresses the camera release button, and shutter blade 1 abruptly opens, resulting in opening of mode-control switch 21; e.g., shutter blade 1 or a projection thereon can displace mode-control switch 21 to open setting. With switch 21 now opened, i.e., upon exposure intiation, control circuit IC switches over to light-integrating and exposure-timing operation, the externally connected light-integrating capacitor 26 now becoming connected into circuit internally of module IC. When the total-light-indicating voltage on timing capacitor 26 reaches a predetermined value, ascertained by a conventional threshold circuit internal to module IC, holding magnet 5, which became energized upon the closing of power-connect switch 24, falls deenergized, and the aperture-reblocking blade 2 of the shutter closes, thereby terminating the exposure.

During the course of the exposure itself, and starting from its initiation, exposure-aperture diaphragm 3, 4 progressively opens. At one extreme, if the scene-light level is extremely intense, then shutter blade 2 will close at a moment in time when the aperture size of diaphragm 3, 4 is still quite small. At the other extreme, if the scene-light leve is low, diaphragm 3, 4 will have opened to a sizable aperture, or indeed to full aperture, by the time or before shutter blade 2 terminates the exposure.

It will be appreciated that the illustrated system is completely automatic, in that the user need make no particular selection and the system itself selects both aperture size and exposure duration, in accordance with the preestablished functional interdependence between aperture size and exposure duration decided upon by the camera designer. On the other hand, the user can intervene to influence, by means of manual preselection, which one of several predesigned programs the system will actually follow when the camera relase button is depressed, namely by means of selector switch 6. For example, ordinarily the user may leave selector switch 6 in its "O" setting, keeping load resistor R2 (FIG. 4) connected in circuit with motion-retarding coil 8, and when the release button is depressed the system will, on its own, select what combination of exposure-duration and aperture-size values to implement. On the other hand, if it is for example obvious to the user that the subject matter to be photographed requires a very short exposure duration, e.g., a sporting event, the user can shift selector switch to setting "S", to inform the system that the need for a short exposure duration is to be given preeminence. At the level of implementation, this connects load resistor R3 to motion-retarding coil 8, thereby lowering the motion-retarding force and allowing exposure-aperture 3, 4 to open more switfly than in setting "O". As a result, a greater amount of light is incident upon the camera film, making possible a shorter-duration exposure, and furthermore, the amount of light incident on light sensor 13 is likewise boosted, so as actually to result in the requisite shorter exposure. Conversely, if the user shifts selector switch to setting "Z", this gives priority to smaller aperture sizes or, equivalently, longer exposure durations, although, here again, after the user presses the camera release button the actual combination of aperture-size value and exposure-duration value is selected by the system itself.

When the user decides to change from one to another of the three available programs "S", "O" and "Z", it is of course necessary that the light-sufficiency measuring circuit be informed of the user's selection; otherwise, the scene-light signal developed by light detector 13 prior to exposure initiation will not be correctly interpreted. Accordingly, in the control circuitry in FIG. 4, selector switch 6 additionally operates to connect into series with light detector 13 one or another of three different resistors R4, R5, R6, depending upon which of the three load resistors R1, R2, R3 has been switched into the circuit of motion-retarding coil 8.

Load resistors besides R1, R2, R3 in FIG. 4 can be utilized to make the electromagnetic motion-retarding action dependent upon various sensed physical quantities of relevance. For example, in FIG. 4 there is connected in circuit with motion-retarding coil 8 a resistive stage 27 exhibiting negative-temperature-coefficient behavior. If the camera is operated in very low temperatures, the resulting increase in the mechanical friction of moving components has a tendency to slow down the speed with which the double diaphragm 3, 4, 12 opens up upon exposure initiation. The use of an NTC resistive stage 27 increases the load resistance of damping coil 8, and thereby lowers the motion-retarding force produced, in response to decreased operating temperature. In NTC resistive stage 27, various NTC resistors and ohmic resistors can be interconnected in series and parallel combinations, to yield a temperature compensation action matched to the temperature-dependent behavior exhibited by the particular mechanical components employed.

Likewise, for example, the load for coil 8 can include a light-dependent resistive stage 28 whose resistance decreases with increasing light incidence. As a result, if the scene-light level is particularly intense, the resulting resistance decrease will automatically increase the motion-retarding action produced, assuring that exposure aperture 3, 4 opens correspondingly slower. This can be of advantage when very high sensitivity film is involved, because it assures that incidence of the required total amount of light upon the film will not occur so instantaneously that the shutter system cannot close fast enough to cope with it.

In addition or as an alternative to the foregoing, the camera can be provided with means for direct and absolute manual preselection of aperture size. In the exemplary embodiment illustrated in FIGS. 1 and 2, this can be accomplished by the user turning a (not shown) dial on the exterior of the camera housing from a zero setting to a numerical setting indicating the desired aperture size. When such dial is moved from zero setting, this overrides the progressive-opening action of exposure diaphragm 3, 4 by unlatching latch 11, and an eccentric 30 coupled to such dial is turned, i.e., by the user, from the illustrated inoperative setting to a setting located in the path of motion of control lever 19, so that lever 19 is pulled by spring 10 against eccentric 30, maintaining the aperture of diaphragm 3, 4 at a fixed size throughout the exposure, which the user initiates after performing this adjustment. The diaphragm 3, 4 will now be at non-zero aperture size right from initiation of the exposure, and therefore admit more light in that sense, and at least to a certain extent this can be taken into account inherently by the fact that a second diaphragm aperture 12 will have a larger aperture size during the light-sufficiency measurement preliminary to exposure initiation. If that does not, in a particular design, of itself sufficiently compensate for direct manual selection of exposure-aperture size, the progressively shaded filter 17 can be used, instead of or in addition to its film-sensitivity selecting function, to modify the light incident on light detector 13 as a function of the selected fixed aperture size; in FIG. 4, filter 17 is shown mechanically coupled to and its setting determined by the setting of plunger magnet 18; it will be understood that the setting of the latter is determined by the setting of the eccentric 30 just referred to. Alternatively, if the second diaphragm having aperture 12 is variable in size independently of diaphragm 3, 4, the requisite compensation could be effected by automatic adjustment of the size of aperture 12, e.g., using a control cam cooperating with eccentric 30.

In addition or as an alternative to the foregoing, the eccentric 30 can be coupled to the focussing or distance-selecting ring of the camera. The intensity of light emitted by the camera's flash unit, i.e., as reflected from the subject to be photographed, depends upon the distance from the subject to the camera. Accordingly, with eccentric 30 coupled to the focussing ring, the aperture size of exposure diaphragm 3, 4, and likewise the size of control aperture 12, is automatically brought to a value determined by subject distance and therefore appropriate for the light conditions which will prevail during the exposure when the flash is produced; eccentric 30 can be configured to implement the subject-distance-dependent function required.

It will be understood that each of the elements described above, or two or more together, may also find a useful application in other types of constructions and circuits differing from the types described above.

While the invention has been illustrated and described as embodied in the context of a particular shutter system, it is not intended to be limited to the details shown, since various modifications and structural changes may be made without departing in any way from the spirit of the present invention.

Thus, for example, in the illustrated embodiment, the two diaphragms 3, 4 and 12 are each of the two-blade type, and indeed are constituted by shared blades. It will be understood, however, that this is not absolutely necessary, and that these two diaphragms could be separate, but cooperating, e.g., coupled-together, structures. Indeed, in principle, the two diaphragms could be unconnected, although each controlled in its setting by various ones of the adjustments referred to above. For example, the two diaphragms could be independent, but driven by respective spring-driven mechanisms, i.e., like drive spring 10, so that, although independent, they each perform an opening movement identical to those they perform in FIGS. 2 and 3, which however, would make it possible to take various exposure parameters into account by adjusting the size and/or opening speed of just one of them.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A shutter diaphragm mechanism, comprising:
   a plurality of movable blades which can be moved towards and away from each other and can thereby decrease and increase a thickness of a beam of light passed between the blades in accordance with their movement;
   a movable escapement mechanism cooperating with the blades to move them towards and away from each other;

a spring attached to the escapement mechanism and urging it to allow the blades to move away from each other; and an adjustable damper attached to the escapement mechanism and opposing movement thereof, the adjustable damper including a fixed coil, a permanent magnet located within the coil and linked to the escapement mechanism in a manner that the magnet moves axially within the coil in response to movement of the escapement mechanism, and a variable resistance connected across the coil.

2. The shutter diaphragm mechanism defined by claim 1, wherein the blades each have a first and a second end and are pivoted intermediate their ends, whereby when the blades are moved towards and away from each other and a first beam of light is incident upon the first ends and a second beam of light is incident upon the second ends, that a first thickness of the first beam of light passed between the first ends of the blades will be decreased and increased and a second thickness of the second beam of light passed between the second ends of the blades will be decreased and increased.

3. The shutter diaphragm defined by claim 2, wherein the first ends are located behind a camera objective lens, and wherein the second ends are located in front of a photosensitive element.

4. Thus shutter diaphragm defined by claim 1, further including a shutter located adjacent to the blades in such a position that the shutter will cut the beam off when the shutter is closed and will allow the beam to pass when the shutter is open.

5. The shutter diaphragm defined by claim 1, further including an exposure meter coupled to the shutter and shutter diaphragm and causing them to operate in a manner that a properly exposed picture is produced in an adequate ambient light environment.

6. The shutter diaphragm defined by claim 5, wherein the exposure meter is coupled to the variable resistance in a manner that the exposure meter causes a properly exposed picture to be restricted to a single set of blade positions and shutter speeds chosen from a plurality of sets of blade positions and shutter speeds, depending upon resistance of the variable resistance.

7. The shutter diaphragm defined by claim 4, wherein there are two blades.

8. The shutter diaphragm defined by claim 7, wherein the ends of each blade are curved and have concaves facing towards each other.

* * * * *